Patented Dec. 29, 1931

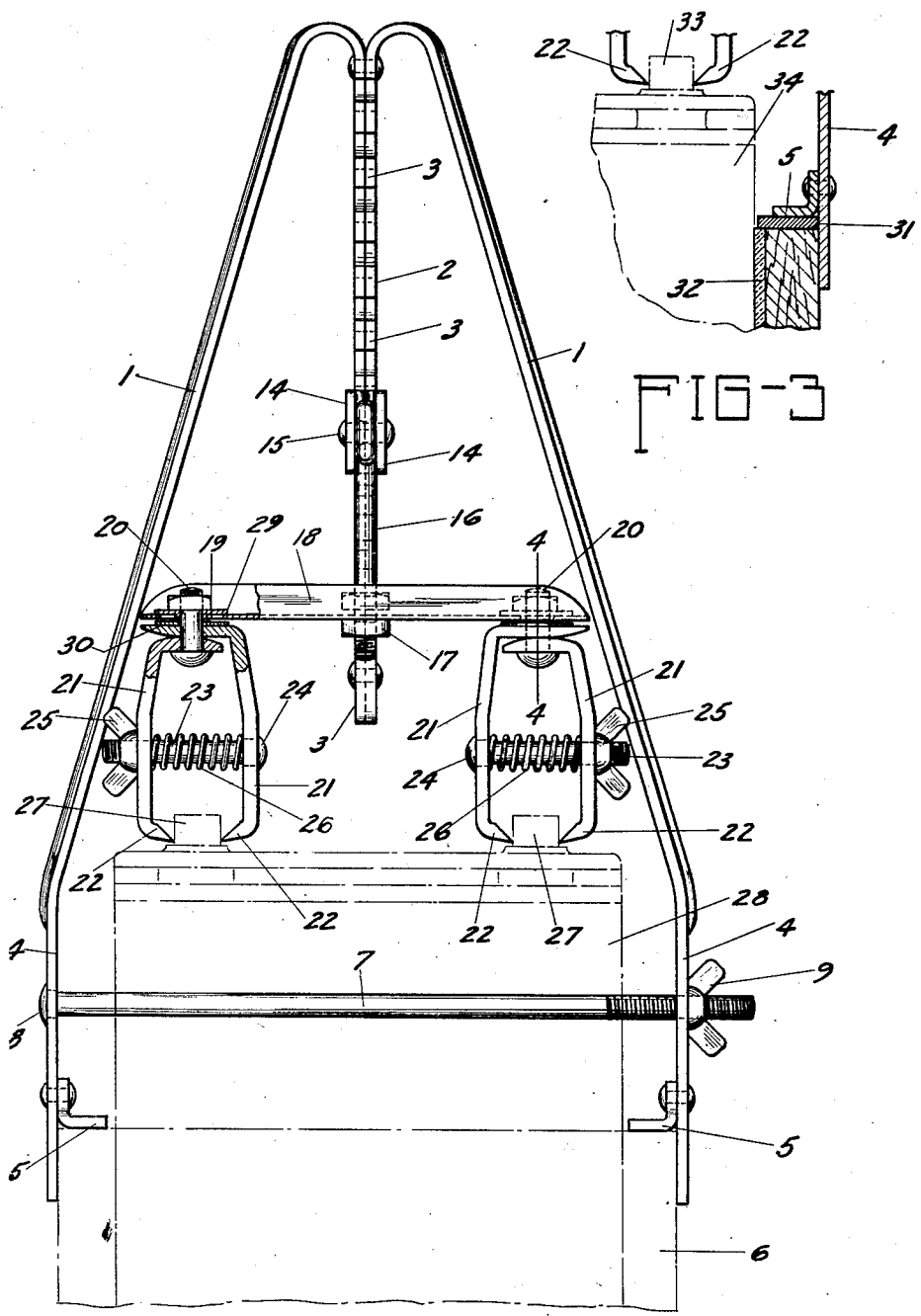

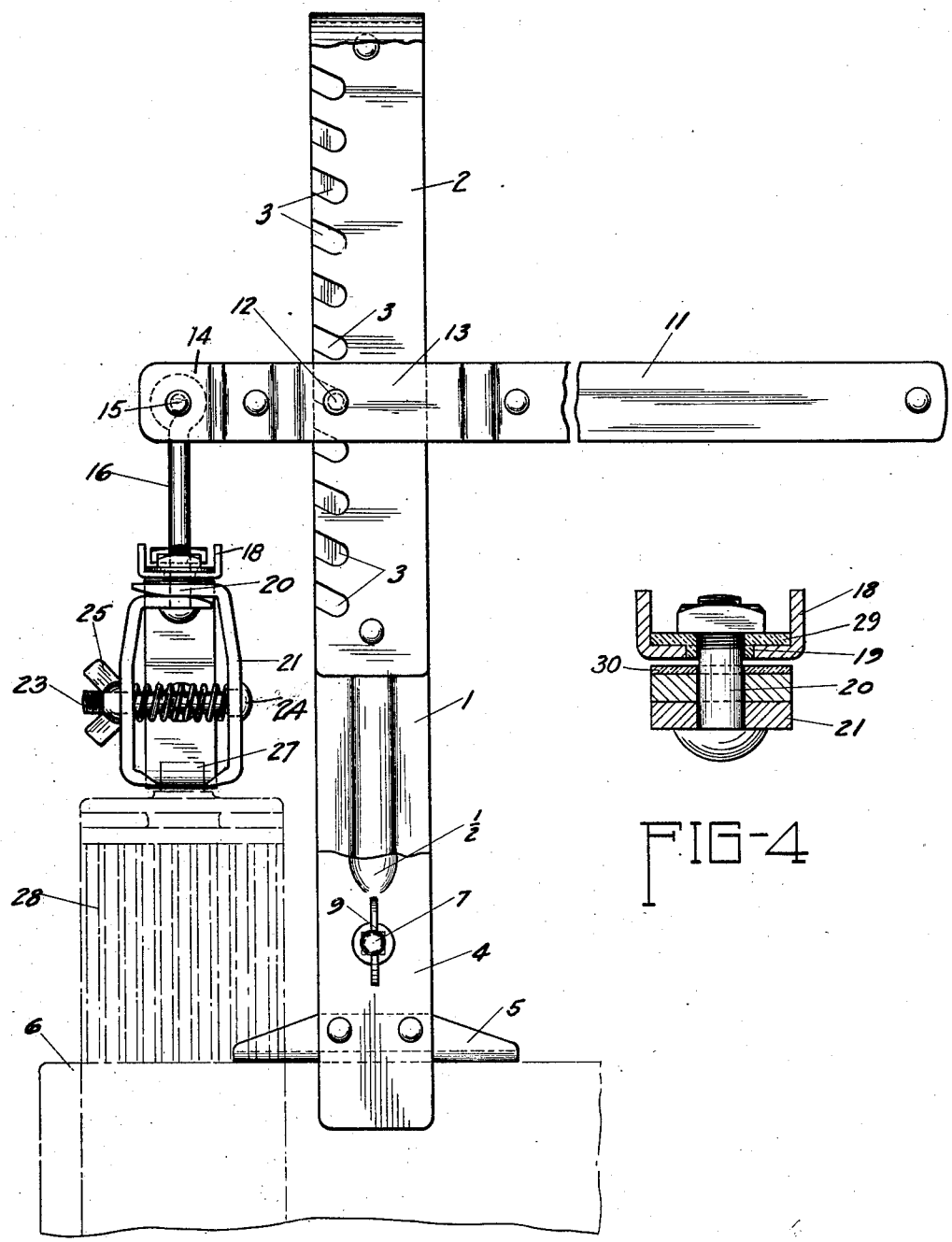

1,838,738

UNITED STATES PATENT OFFICE

WILLIAM F. BRADLEY, OF ROCK ISLAND, ILLINOIS

ELECTRICAL BATTERY CELL EXTRACTOR

Application filed December 14, 1929. Serial No. 413,994.

My invention has reference to an electric battery cell extractor, and has for its chief purpose to provide a means whereby the cells of a battery may be removed without steaming or otherwise heating the sealing compound with which the cells are held in place.

As set forth herein the device consists of a frame of simple construction adapted for mounting on the side edges of a battery box, and provided with a central support for a hoisting lever capable of vertical adjustment thereon so that it is possible to separate a cell from the box by a succession of movements. Supported by said lever is a pair of grapples of novel construction each adapted for engagement with one of the posts of a cell. The grapples are suspended so as to be movable about a common center, are capable of adjustment to or from each other, and are each provided with a pair of grappling elements adjustable with reference to each other, and supplied with means whereby said jaws can be tightly clamped upon one of the cell posts.

As set out herein the device is formed almost entirely of strap metal, and can be cheaply produced. The action of the apparatus is positive, safe, and speedy, and it can be operated with cells the posts of which have been badly mutilated.

The above named, and other features and advantages of the invention will be more fully understood from the following specification, reference being had to the accompanying drawings, in which:—

Fig. 1 shows the invention in front elevation, in position on a battery box, with some parts in section.

Fig. 2 is a side view thereof with a part of one of the legs 1 partly broken away.

Fig. 3 is a cross-section through one side of the frame, showing a modified use of the invention.

Fig. 4 is a cross-section on the broken line 4—4 of Fig. 1.

The device includes a supporting frame, consisting of a pair of arched legs 1, centrally of which depends a vertical support 2, provided with regularly spaced notches 3. Said support is preferably formed by turning the upper ends of the legs 1 downwardly into a pair of extensions and securing the same rigidly together, as in Fig. 1. At the lower ends of the legs 1 are downwardly bent portions 4, to which are secured feet 5, of angle-plate formation, and adapted for engagement with the edges of a battery box, indicated at 6. The legs 1 possess a limited amount of resiliency, so that they can be adjusted to boxes of varying widths, and they may be secured thereon by means of a rod 7, provided at one end with a head 8 and at the other end with a threaded portion to receive a thumb-nut 9, by means of which the frame can be tightly clamped in place. Beneath the head 8 is a squared portion engaging an opening of corresponding shape to hold the rod from turning in the frame.

Fulcrumed on the support 2 is a hand-lever 11, by means of a pin 12 spanning an opening formed in the lever at 13, said lever being also preferably formed of two pieces of strap metal riveted or otherwise held together, and said pieces being spread to form the opening at 13, for the passage of the support 2. Said pieces are also spread at the short end of the lever, as at 14, and provided with a pin 15, upon which is supported an eye-bolt 16, the lower end of which is threaded to receive a nut 17. Supported on said nut so as to move freely on the bolt is a bar 18 of channelled formation, in the ends of which are longitudinal slots 19, in which are bolts 20, provided on their upper ends with nuts which are supported on the bar 18. On the headed ends of said bolts are supported pairs of angle-frames 21, the lower ends of which are fitted into jaws 22 for engagement with the opposite posts 27 of a cell 28, contained in the box 6 already referred to. Each pair of frames 21 is united by a rod 23, passing through openings in the frames, and provided at one end with heads 24, and on the threaded ends with wing-nuts 25. The rods are also held from turning in said frames by squared portions adjoining the heads, and holding in the frame. Said frames are held normally in spread position by means of coiled springs 26 on the rods 23.

When it is desired to extract a battery cell the jaws 22 are engaged with the posts 27, the frames 21 being movable to or from each other by means of the slots 19 to get the proper adjustment. In case the posts are out of alignment with each other a further adjustment of the grapples can be made by turning them with the bar 18 on its pivot. For lifting the cell the hand-lever is first positioned with the pin 12 in one of the lower notches 3, and upon the posts being engaged by the grapples the lever is rocked in a direction to move the cell upwardly, the box 6 being at the same time held from upward movement by the frame supported thereon. After being moved as far upwardly as convenient the long arm of the lever 11 is raised until the pin 15 is permitted to dis-engage from the notch in which it rests, and the lever is raised until said pin is re-engaged with one of the notches higher up in the support, whereupon the cell is again moved upwardly. By a series of such operations the cell is entirely removed from the box. In the several adjustments of the hand-lever the friction of the walls of the cell in the box is sufficient to hold the same from returning downwardly, and the cell provides a support for the hand-lever, upon which it is rockingly fulcrumed, permitting the longitudinal movement of the lever which is required in dis-engaging the pin 12 and re-engaging the same, and making it possible to perform the operation with one hand.

In the upward movement of the cell it is in a substantially horizontal position, with no danger of any of the parts coming in contact with the rubber coating at the top of the cell, to cause injury thereto.

At the points where the frames 21 are in contact with each other they are of a curved formation, providing a rocking bearing, and permitting a wider spread of the jaws. To prevent any leakage of the current which may be in the cell by way of the machine an insulation pad is provided at 29, projecting downwardly into the slot 19, and other insulation washers 30 are interposed between the lower face of the bar 18 and parts just below the same.

In Fig. 3 is shown an arrangement of the device for use in removing the plates from a battery of a former style, and still in use to some extent. This consists in the provision of auxiliary plates 31 at each side of the machine, between the foot 5 and upper edge of the box 6. These plates project inwardly above the edges of the jar 32 of an old style battery, so as to hold said jar from movement upwardly. The grapples are applied to the posts 33 of the plates 34, in the manner hereinbefore described, by means of which the plates can be extracted from the jar by the operation of the lever and hoisting devices before pointed out.

What I claim, and desire to secure by Letters Patent, is,—

1. A device of the class described, comprising an arch frame adapted for attachment to the sides of a battery box, a support depending centrally of said frame, provided with a series of lever engaging devices, a lever operatively connected with said support and capable of adjustable engagement with said devices, a grappling mechanism having a swivel connection with said lever, including a pair of grapples for engagement with the posts of a battery cell, and means for clamping the jaws of said grapples on such posts.

2. A device of the class described, comprising an arch frame, adapted for support on and attachment to the sides of a battery box, a support centrally of said frame, provided with a series of notches, a hand-lever provided with means for selective engagement with said notches, a grappling mechanism swingingly and rotatably supported from said hand-lever, a pair of grapples in said mechanism for engagement with the posts of a battery cell, provided with jaws held yieldably apart, and means for clamping said jaws on the posts.

3. A device of the class described, comprising an arch frame adapted for support on the sides of a battery box, means for clamping said frame on a box, a support depending centrally of said frame, provided with adjustment devices, a hand-lever provided with means for selective engagement with said adjustment devices, a cross-bar rockingly and pivotally supported from said hand-lever, and a pair of grappling devices pivotally connected with the ends of said cross-bar and capable of a limited movement to and from each other.

4. A device of the class described, comprising an arch frame provided with legs for engagement with the sides of a battery box and adjustable to the width thereof, a central support provided with a series of notches, a hand lever provided with means for engagement with said notches, a cross-bar swingingly and pivotally supported by said hand lever, pivotal supports in the ends of said cross-bar, grappling devices hung on said pivotal supports, consisting of frames overlapping at the pivotal points, and provided with bladed jaws for engagement with the posts of a cell, and means for drawing said frames together to cause a clamping action of the jaws.

In testimony whereof I affix my signature.

WILLIAM F. BRADLEY.